March 27, 1951

P. J. M. RICHARTZ 2,546,319

EXTERNAL FLASH SYNCHRONIZING ATTACHMENT
FOR CAMERA SHUTTERS
Filed Feb. 24, 1949

INVENTOR.
Paul J.M. Richartz
BY

Patented Mar. 27, 1951

2,546,319

UNITED STATES PATENT OFFICE 2,546,319

EXTERNAL FLASH SYNCHRONIZING ATTACHMENT FOR CAMERA SHUTTERS

Paul J. M. Richartz, New York, N. Y., assignor to Jacques Bolsey, New York, N. Y.

Application February 24, 1949, Serial No. 78,199

5 Claims. (Cl. 95—11.5)

My present invention relates to a flash lamp synchronizer attachment for photographic cameras, and more particularly for cameras having a release lever movable from inoperative into releasing position and an internally screw-threaded cable release socket.

It is an object of my present invention to provide a flash lamp synchronizer of the above type which is simple in construction and nevertheless reliable in operation.

It is also an object of my present invention to provide a synchronizer which can be attached to a camera without the necessity for any constructive changes in the same and without interfering with operation of the camera by a cable release.

With the above objects in view, a flash lamp synchronizer according to my present invention comprises in combination an electrically insulating supporting member, an electrical contact member mounted on the electrically insulating supporting member, means attached to the electrically insulating supporting member for adjusting the position of the electrical contact member relative to the electrically insulating supporting member, means attached to the electrically insulating supporting member for securing the same to a photographic camera in such a position that the electrical contact member is contacted by the release lever when the same is manually moved and reaches its releasing position, and electrical connecting means mounted on the electrically insulating supporting member electrically connected with the electrical contact member and adapted to be connected with an electric wire leading to a flash lamp.

A particularly preferred synchronizer construction includes an electrically insulating supporting member, an electrical contact spring mounted on the electrically insulating supporting member and including a free end portion having the tendency to bend away from the electrically insulating supporting member, screw means mounted on the electrically insulating supporting member for bending the free end portion on the electrical contact spring toward said electrically insulating supporting member so as to adjust its position, metallic securing means attached to the electrically insulating supporting member for securing the same to a photographic camera in such a position that the free end portion of the electrical contact spring is contacted by the release lever when the same is manually moved and reaches its releasing position, first electrical connecting means mounted on the electrically insulating supporting member electrically connected with the electrical contact spring and adapted to be connected with an electric wire leading to a flash lamp, and second electrical connecting means mounted on the electrically insulating supporting member contacting the metallic securing means and adapted to be connected with another electric wire leading to the flash lamp.

Another synchronizer construction according to my present invention includes a supporting member, synchronizer means mounted on this supporting member, a securing screw attached to the supporting member and having at its one end an externally screw-threaded end portion being screwable into the internally screw-threaded cable release socket of a camera in such a manner that the synchronizer means are operated by the release lever of the camera when the same is manually moved and reaches its releasing position, a hole passing through the securing screw in axial direction thereof, an internally screw-threaded recess on the other end of the securing screw arranged coaxially with the hole and having the same diameter as the externally screw-threaded end portion of the securing screw, and locking means on the supporting member shaped so as to be adapted to engage a correspondingly shaped surface portion of a camera when the supporting member is secured by the securing screw to this camera, preventing turning of the supporting member about the securing screw and holding it in proper operative position with the synchronizer means operable by the release lever of the camera.

Of course, the synchronizer means mentioned in the preceding paragraph preferably include the spring contact and the adjusting screw described above.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
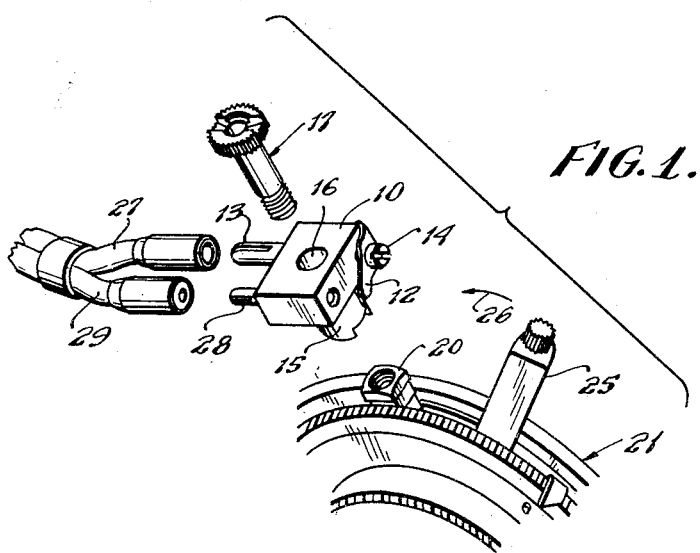
Fig. 1 is a perspective view of a flash lamp synchronizer according to my present invention.
Figure 3:
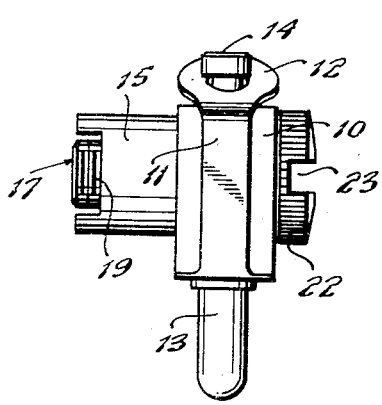
Fig. 3 is an end view of the synchronizer shown in Figs. 1 and 2, seen in direction of arrow 3 of Fig. 2.
Figure 2:
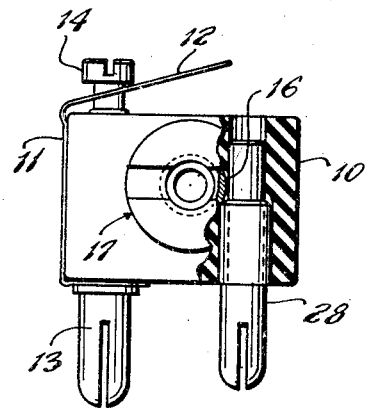
Fig. 2 is a side view of the synchronizer shown in Fig. 1, partly in section.
Figure 4:
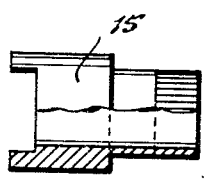
Fig. 4 is a side view of the locking member forming part of the synchronizer shown in Figs. 1 to 3, partly in section.
Figure 5:
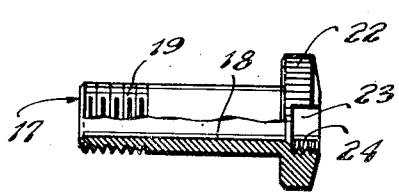
Fig. 5 is a side view, partly in section, of the securing screw forming part of the synchronizer shown in Figs. 1 to 3.

My new synchronizer includes as main portions a supporting insulating member 10, the contact spring 11 having a free end portion 12 and secured by means of the contact prong 13 and the adjusting screw 14 to the insulating supporting member 10.

Furthermore, the synchronizer shown in the drawing includes a sleeve-shaped metallic locking member 15 passing through a corresponding hole 16 in the insulating supporting member 10, tightly fitting into this hole so as not to be adapted to turn or slide relative to the same.

Through this sleeve-shaped locking member 15 passes a securing screw 17. This screw 17 is provided, in accordance with my present invention, with a hole 18 and has an externally screw-threaded end portion 19 fitting into the internally screw-threaded cable release socket 20 of the shutter mechanism 21.

Screw 17 is also provided with a screw head 22 and a slot 23 within the same for screwing the screw into and out of socket 20.

I wish to stress that in accordance with my present invention I provide in the screw head 22 an internally screw-threaded recess 24 having the same diameter as the screw-threaded end portion 19 of the screw so as to enable attachment of the cable release to the rear end of the screw and operation of the release through the hole 18 in the same.

My new synchronizer is mounted and operated as follows:

The synchronizer is placed on the shutter mechanism 21 with the rectangular cable release socket 20 of this mechanism fitting into a slot of the locking member 15 of the synchronizer, preventing turning of the synchronizer relative to the camera.

Then the entire synchronizer is secured to the camera by screwing screw 17 into the internally screw-threaded cable release socket 20.

Thereafter, the free end portion 12 of the contact spring 11 is adjusted by means of screw 14 so as to be contacted by the release lever 25 the moment the same reaches its releasing position during turning in direction of arrow 26.

Finally, the wire 27 leading to the flash lamp is connected to the contact prong 13.

I wish to note that it is possible to establish the other electric connection which is necessary between the release lever 25 and the flash lamp by means of the bracket by which the flash lamp is usually secured to the camera. However, in order to make it possible to use the lamp without bracket attachment, I prefer to provide a second contact prong 28 mounted in the supporting member 10 so as to contact the locking member 15 and to be in electrical contact via the same and the cable release socket with the release lever 25.

This prong 28 is connected to wire 29 leading also to the flash lamp.

The above synchronizer is operated simply by moving the release lever 25 in direction of arrow 26 into releasing position. In such releasing position the lever operates the shutter and simultaneously establishes contact with the contact spring 11, operating the flash lamp.

It will be understood that each of the elements described above, or two or more together, may also find a useful application in other types of synchronizer arrangements, differing from the types described above.

While I have illustrated and described the invention as embodied in external synchronizers for photographic cameras, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. Flash lamp synchronizer attachment for a photographic camera having a release lever movable from inoperative into releasing position and an internally screw-threaded cable release socket, said flash lamp synchronizer comprising in combination an electrically insulating supporting member; an electrical contact member mounted on said electrically insulating supporting member; means for adjusting the position of said electrical contact member relative to said electrically insulating supporting member; electrical connecting means mounted on said electrically insulating supporting member electrically connected with said electrical contact member and adapted to be connected with an electric wire leading to a flash lamp; a securing screw passing through said supporting member and having at its one end an externally screw-threaded end portion being screwable into the internally screw-threaded cable release socket of a camera in such a manner that said supporting member is secured to said cable release socket and that said electrical contact member is contacted by the release lever when the same is manually moved and reaches its releasing position; a hole passing through said securing screw in axial direction thereof; and an internally screw-threaded recess on the other end of said securing screw arranged coaxially with said hole and having the same diameter as said externally screw-threaded end portion of said securing screw.

2. Flash lamp synchronizer attachment for a photographic camera having a release lever movable from inoperative into releasing position and an internally screw-threaded cable release socket, said flash lamp synchronizer comprising in combination an electrically insulating supporting member; an electrical contact member mounted on said electrically insulating supporting member; means for adjusting the position of said electrical contact member relative to said electrically insulating supporting member; electrical connecting means mounted on said electrically insulating supporting member electrically connected with said electrical contact member and adapted to be connected with an electric wire leading to a flash lamp; a securing screw turnably passing through said supporting member and having at its one end an externally screw-threaded end portion being screwable into the internally screw-threaded cable release socket of a camera in such a manner that said supporting member is secured to said cable release socket and that said electrical contact member is contacted by the release lever when the same is manually moved and reaches its releasing position; a hole passing through said securing screw in axial direction thereof; an internally screw-threaded recess on the other end of said securing screw arranged coaxially with said hole and having the same diameter as said externally screw-threaded end portion of said securing screw; and locking means on said supporting member shaped so as to be adapted to engage a corresponding shaped surface portion of a camera when said supporting member is secured by said securing screw to this camera, preventing turning of said supporting member about said securing screw and holding it in proper operative position with said electrical contact member in the path of the release lever when the same is manually moved and reaches its releasing position.

3. Flash lamp synchronizer attachment for a photographic camera having a release lever movable from inoperative into releasing position and an internally screw-threaded cable release socket, said flash lamp synchronizer comprising in combination an electrically insulating supporting member; an electrical contact spring mounted on said electrically insulating supporting member; screw means mounted also on said electrically insulating supporting member for adjusting the position of said electrical contact spring relative to said electrically insulating supporting member; electrical connecting means mounted on said electrically insulating supporting member electrically connected with said electrical contact spring and adapted to be connected with an electric wire leading to a flash lamp; a securing screw freely turnably passing through said supporting member and having at its one end an externally screw-threaded end portion being screwable into the internally screw-threaded cable release socket of a camera in such a manner that said supporting member is secured to said cable release socket and that said electrical contact spring is contacted by the release lever when the same is manually moved and reaches its releasing position; a hole passing through said securing screw in axial direction thereof; an internally screw-threaded recess on the other end of said securing screw arranged coaxially with said hole and having the same diameter as said externally screw-threaded end portion of said securing screw; and locking means on said supporting member shaped so as to be adapted to engage a correspondingly shaped surface portion of a camera when said supporting member is secured by said securing screw to this camera, preventing turning of said supporting member about said securing screw and holding it in proper operative position with said electrical contact spring in the path of the release lever when the same is manually moved and reaches its releasing position.

4. Flash lamp synchronizer attachment for a photographic camera having a release lever movable from inoperative into releasing position and an internally screw-threaded cable release socket, said flash lamp synchronizer comprising in combination an electrically insulating supporting member; an electrical contact spring mounted on said electrically insulating supporting member and including a free end portion having the tendency to bend away from said electrically insulating supporting member; screw means mounted on said electrically insulating supporting member for bending said free end portion on said electrical contact spring toward said electrically insulating supporting member so as to adjust the position of the same relative to said electrically insulating supporting member; electrical connecting means mounted on said electrically insulating supporting member electrically connected with said free end portion of said contact spring and adapted to be connected with an electric wire leading to a flash lamp; a securing screw turnably mounted in said supporting member and having at its one end an externally screw-threaded end portion being screwable into the internally screw-threaded cable release socket of a camera in such a manner that said supporting member is secured to said cable release socket and that said free end portion of said electrical contact spring is contacted by the release lever when the same is manually moved and reaches its releasing position; a hole passing through said securing screw in axial direction thereof; an internally screw-threaded recess on the other end of said securing screw arranged coaxially with said hole and having the same diameter as said externally screw-threaded end portion of said securing screw; and locking means on said supporting member shaped so as to be adapted to engage a correspondingly shaped surface portion of a camera when said supporting member is secured by said securing screw to this camera, preventing turning of said supporting member about said securing screw and holding it in proper operative position with said free end portion of said electrical contact spring in the path of the release lever when the same is manually moved and reaches its releasing position.

5. In a photographic camera a shutter mechanism; a release lever forming part of said shutter mechanism and movable from inoperative into releasing position and back; an internally screw-threaded cable release socket forming also part of said shutter mechanism; a synchronizer supporting member; synchronizer means on said supporting member; a securing screw turnably mounted in said synchronizer supporting member and having at its one end an externally screw-threaded end portion being screwed into said internally screw-threaded cable release socket in such a manner that said synchronizer supporting means is secured to said internally screw-threaded cable release socket and that said synchronizer means are operated by said release lever when the same is manually moved and reaches its releasing position; a hole passing through said securing screw in axial direction thereof; an internally screw-threaded recess on the other end of said securing screw arranged coaxially with said hole and having the same diameter as said externally screw-threaded end portion of said securing screw; and locking means on said synchronizer supporting member shaped so as to engage a correspondingly shaped surface portion of said internally screw-threaded cable release socket, preventing turning of said synchronizer supporting member together with said synchronizer means about said internally screw-threaded cable release socket.

PAUL J. M. RICHARTZ.

REFERENCES CITED

The following references are of record in the file of this patent:

UNITED STATES PATENTS

| Number | Name | Date |
| --- | --- | --- |
| 1,858,691 | Stroeker | May 17, 1932 |
| 1,945,942 | Lang | Feb. 6, 1934 |
| 2,020,741 | Rush | Nov. 12, 1935 |
| 2,180,276 | Carroll | Nov. 14, 1939 |
| 2,262,215 | Ulm | Nov. 11, 1941 |
| 2,264,595 | Schwartz et al. | Dec. 2, 1941 |
| 2,308,017 | Mihalyi | Jan. 12, 1943 |
| 2,484,915 | Strecker | Oct. 18, 1949 |

FOREIGN PATENTS

| Number | Country | Date |
| --- | --- | --- |
| 440,638 | Great Britain | Jan. 3, 1936 |